United States Patent [19]

Fujino et al.

[11] Patent Number: 5,501,565
[45] Date of Patent: Mar. 26, 1996

[54] DEVICE FOR STORING THIN PLATE-FORM PARTS

[75] Inventors: Noboru Fujino; Hisashi Ueda, both of Tokyo, Japan

[73] Assignee: Kabushiki Kaisha Shinkawa, Tokyo, Japan

[21] Appl. No.: 368,715

[22] Filed: Jan. 4, 1995

Related U.S. Application Data

[63] Continuation of Ser. No. 105,513, Aug. 11, 1993, abandoned.

[30] Foreign Application Priority Data

Aug. 12, 1992 [JP] Japan ..................... 4-236383

[51] Int. Cl.⁶ ................................. B65G 39/10
[52] U.S. Cl. ........................... 414/331; 414/273
[58] Field of Search ..................... 414/609, 331, 414/273, 275; 198/345.1

[56] References Cited

U.S. PATENT DOCUMENTS

| | | |
|---|---|---|
| 4,202,092 | 5/1980 | Shibasaki et al. ............ 198/345.1 |
| 4,558,983 | 12/1985 | Freeman et al. ............ 414/331 |
| 4,561,819 | 12/1985 | Wiernicki ............ 414/331 |
| 4,712,963 | 12/1987 | Kondo ............ 414/331 |
| 4,898,268 | 2/1990 | Kamioka et al. ............ 198/345.1 |
| 4,932,828 | 6/1990 | Katae et al. ............ 414/416 |
| 5,024,570 | 6/1991 | Kiriseko et al. ............ 414/273 |
| 5,030,057 | 7/1991 | Nishi et al. ............ 414/273 |
| 5,133,444 | 7/1992 | Thomason ............ 198/345.1 |
| 5,203,661 | 4/1993 | Tanita et al. ............ 414/28 |
| 5,277,539 | 1/1994 | Matsui et al. ............ 414/331 |

*Primary Examiner*—David A. Bucci
*Assistant Examiner*—Thomas J. Brahan
*Attorney, Agent, or Firm*—Koda and Androlia

[57] ABSTRACT

A device for storing plate-from parts such as lead frames including an elevator which carries and positions a storing magazine that receives the lead frames and a loading conveyor which conveys the lead frames to the storing magazine. The loading conveyor is computer-operated so as to shift via a feed screw in a horizontal and perpendicular direction relative to a direction in which the lead frames are transferred. The line position of the loading conveyor is automatically adjusted to match the line position of a transporting conveyor which supplies the lead frames to the loading conveyor and also to match the line position of the storing magazine.

2 Claims, 4 Drawing Sheets

DEVICE FOR STORING THIN PLATE-FORM PARTS

This is a continuation of application Ser. No. 08/105,513, filed Aug. 11, 1993 now abandoned.

BACKGROUND OF THE INVENTION

1. Field of the Invention

The present invention relates to a device for storing thin plate-form parts such as lead frames, etc.

2. Prior Art

In conventional lead frame storing devices used in bonding machines, etc., a storing magazine that accommodates the lead frames in a stacked fashion is positioned and carried on an elevator. When this elevator is raised or lowered one step at a time, lead frames conveyed by a loading conveyor which is installed near the storing magazine are received by the storing magazine one at a time.

This prior art device, however, involves several problems. When the thickness of side plates of the storing magazine changes, the positions of the inside walls of the storing magazine become offset with respect to the loading conveyor. Therefore, the lead frames are not correctly fed into the magazine, and it is necessary to adjust the alignment position of the loading conveyor so that it matches the position of the storing magazine. Furthermore, the line position of transporting conveyors, which convey the lead frames onto the loading conveyor, becomes offset with respect to the line position of the loading conveyor. Thus, the line position of the transporting conveyors must also be adjusted. As seen from the above, the operation preparations are extremely time-consuming.

SUMMARY OF THE INVENTION

The object of the present invention is to provide a device for storing thin plate-form parts which automatically adjusts the line position of the loading conveyor so as to match the line position of the transporting conveyor and to the line position of the storing magazine, so that the time required for operating preparation can be greatly reduced.

The objects of the present invention are accomplished by a unique structure for a device for storing thin plate-form parts, such as lead frames, which comprises (a) an elevator which is raised and lowered and also carries and positions a storing magazine that receives thin plate-form parts, and (b) a loading conveyor which conveys thin plate-form parts that have been conveyed from the transporting conveyor onto the loading conveyor to the storing magazine, and the unique structure is that a loading conveyor driving means is used so that it moves or shifts the loading conveyor in a horizontal direction and perpendicular to the conveying direction of the thin plate-form parts.

With this structure, when a plate-form part is to be fed out from the transporting conveyor, the loading conveyor driving means is actuated so that the loading conveyor is moved or shifted so as to be positioned in a straight line with respect to the transporting conveyor. Then, when the plate-form part on the loading conveyor is to be received by the storing magazine, the loading conveyor driving means is actuated so that the loading conveyor is moved and positioned in a correct position with respect to the storing magazine.

DETAILED DESCRIPTION OF THE INVENTION

One embodiment of the present invention will be described below with reference to FIGS. 1 through 4.

Figure 1:
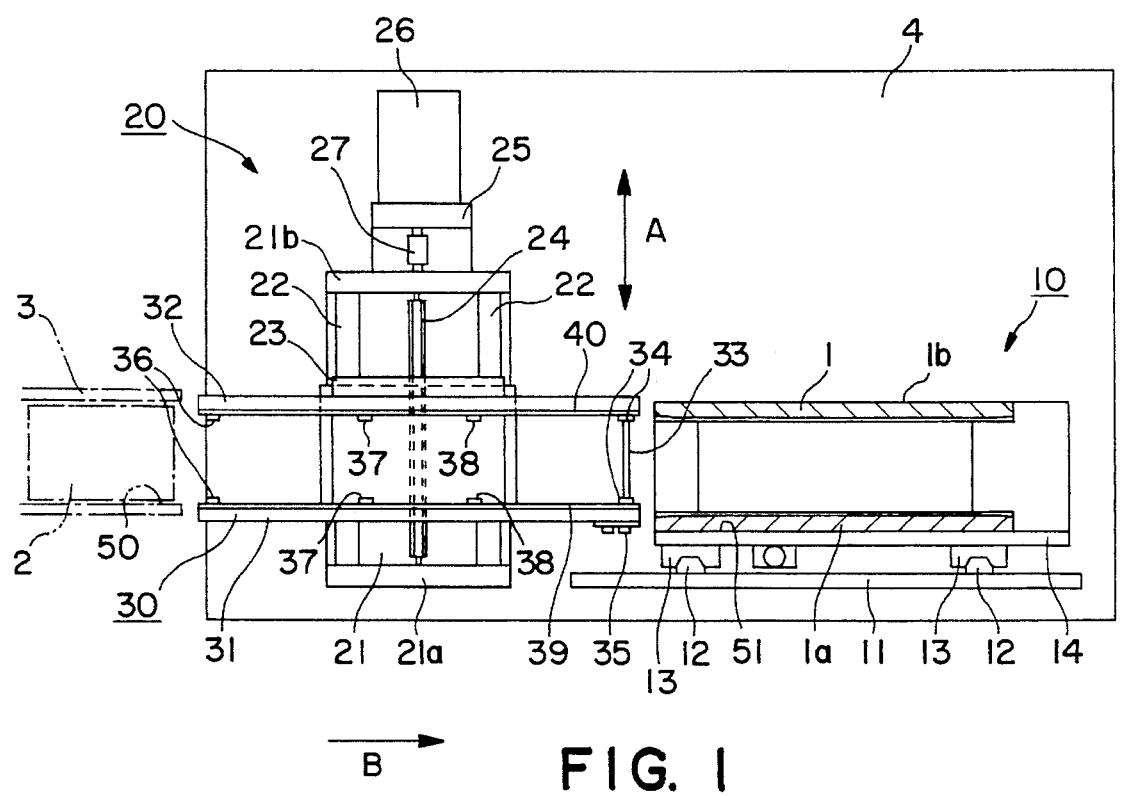
FIG. 1 is a top view of one embodiment of the device for storing thin plate-form parts according to the present invention.
Figure 2:
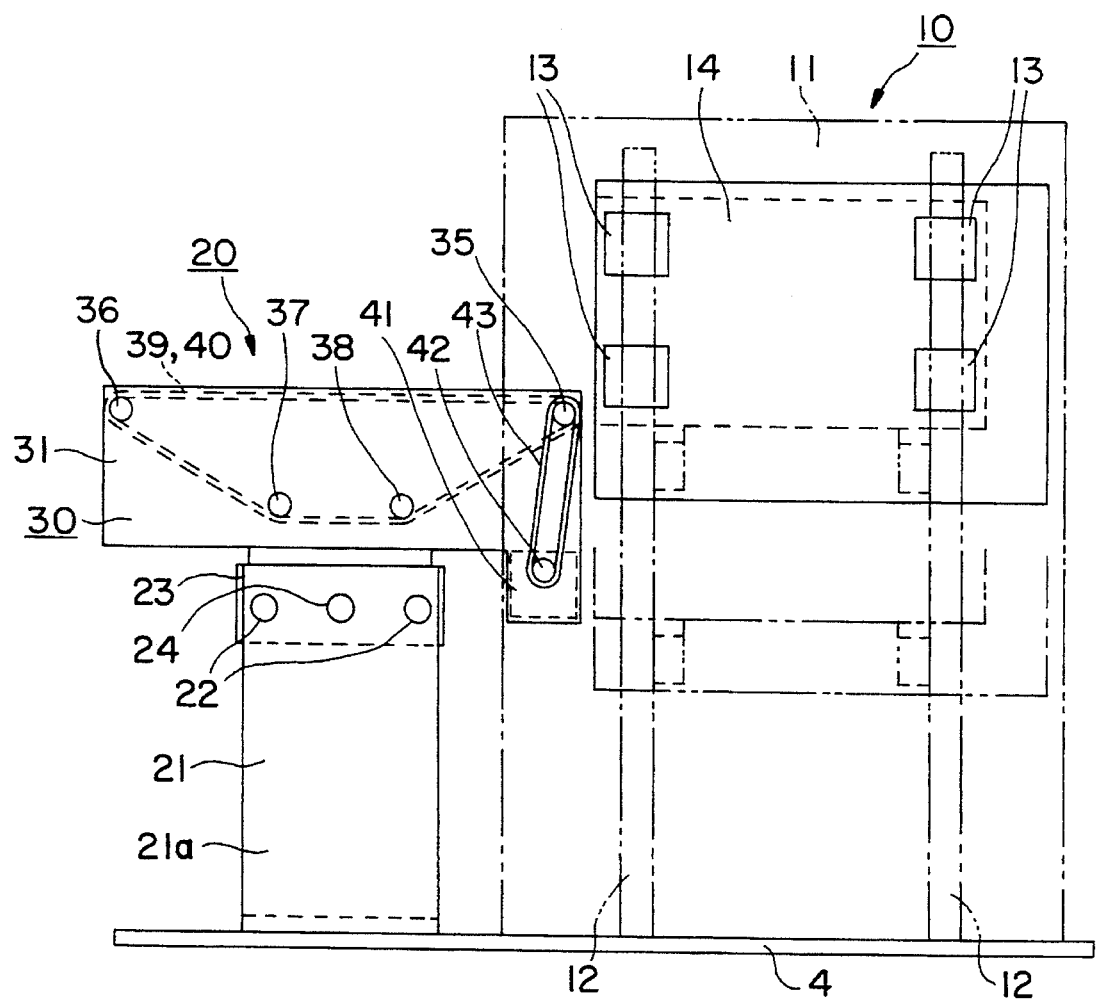
FIG. 2 is a front view thereof.
Figure 3:
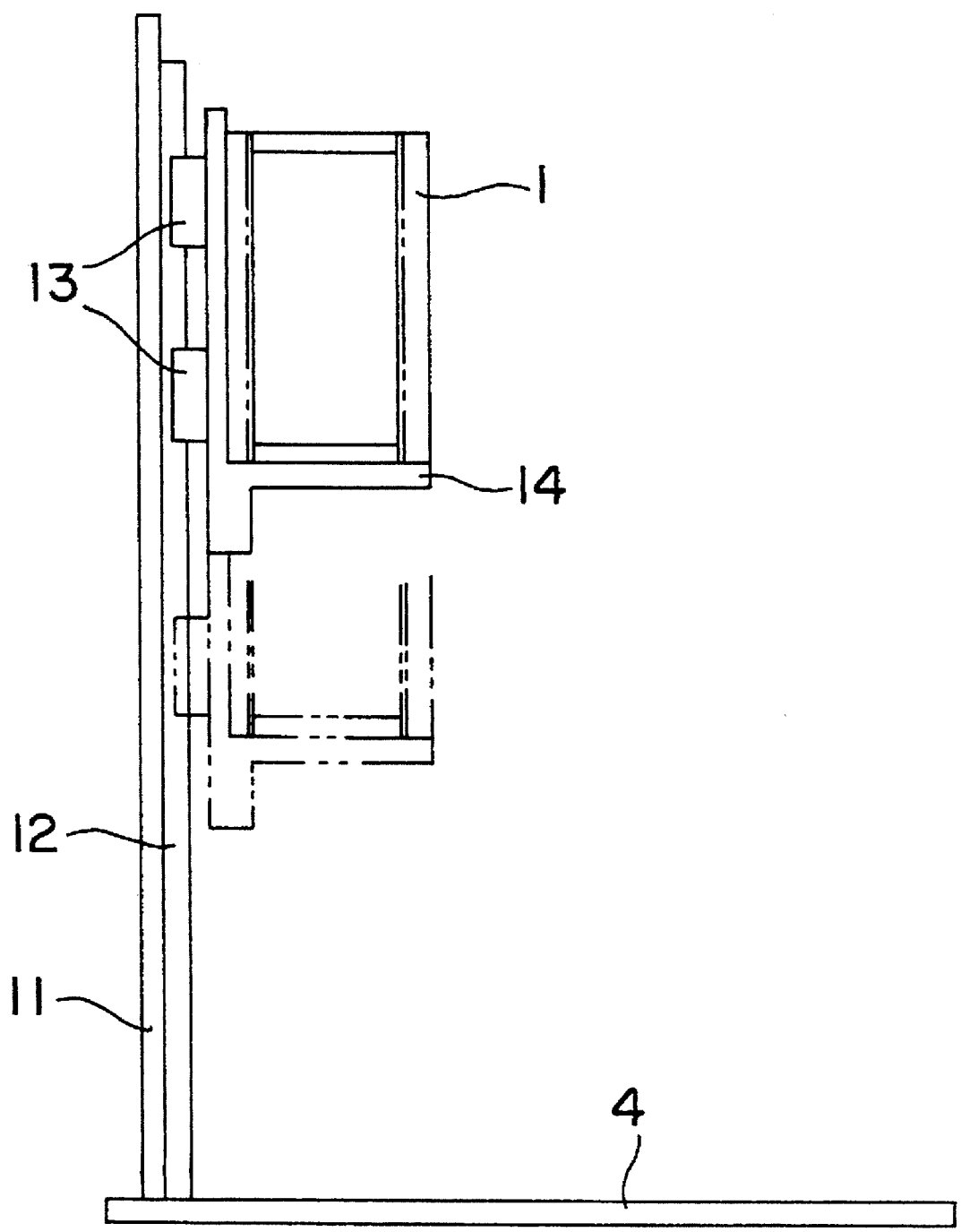
FIG. 3 is a right side view thereof.

As shown in FIGS. 1 through 3, the device of the present invention includes a storing elevator device 10 which moves up and down and carries and positions a storing magazine 1. It further includes a loading conveyor device 20, which conveys plate-form parts such as lead frames 2 between the storing magazine 1 and a transporting conveyor 3.

The transporting conveyor 3 conveys the lead frames 2 to the conveying device 20 so that the conveying device 20 transfers the lead frames to the magazine 1 for storage.

First, the structure of the storing elevator device 10 and then the structure of the loading conveyor device 20 will be described.

The storing elevator device 10 is of a well known structure.

Two linear guide rails 12 are vertically fixed to a vertical wall 11 which is installed on a base stand 4. An elevator 14 is supported and guided by these linear guide rails 12 via linear bearings 13. The elevator 14 is raised and lowered by step feeding at a prescribed pitch using a universally known feed screw mechanism.

A storing magazine 1 which accommodates lead frames 2 inside in a stacked fashion is positioned and carried on the elevator 14. The structure of the storing magazine 1 is well known. The magazine 1 has a shape of a rectangular parallelopiped with two facing surfaces open. Numerous grooves (not shown) which support the lead frames 2 one at a time are formed in the two side plates 1a and 1b of the storing magazine 1.

The positioning of the storing magazine 1 is made by tightly fitting one side plate 1a onto the elevator 14. However, when the thickness of this side plate 1a changes, the positions of the lead frame supporting grooves of the storing magazine 1 are offset, though slightly, in the horizontal direction. The solution for this is done by the present invention, and it will be described below.

The structure of the loading conveyor device 20 will be described.

A supporting stand 21 is installed to the base stand 4. The stand 21 is positioned next to the vertical wall 11. Two guide bars 22 which are installed in a horizontal direction and perpendicular to the lead frame storing direction of the storing magazine 1, and the ends of the bars 22 are fastened to the vertical walls 21a and 21b of the supporting stand 21. A table 23 is guided and supported by these guide bars 22 so that the table 23 can slide along the guide bars 22. The table 23 engages with a feed screw 24 which is supported on the vertical walls 21a and 21b of the supporting stand 21. The feed screw 24 is a rotatable, cylindrical component with a screw grooved on its outer surface. In addition, a motor supporting plate 25 is fixed to the vertical wall 21b, and a feed motor 26 is mounted to this motor supporting plate 25. The output shaft of the feed motor 26 is coupled to the feed screw 24 via a coupling 27.

A loading conveyor 30 is installed on the table 23. The conveyor 30 is provided in the direction in which the storing magazine 1 stores the lead frames 2. The loading conveyor 30 has conveyor supporting frames 31 and 32 which are fastened to the table 23 so that the frames 31 and 32 face each other.

A drive shaft 33 is rotatably supported on the conveyor supporting frame 31. The drive shaft 33 is located near the storing elevator device 10. A pair of pulleys 34 are fastened to the drive shaft 33 so that they are on the inner side of the conveyor supporting frames 31 and 32. A pulley 35 is also fastened to the drive shaft 33. The pulley 35 is on the outer side of the conveyor supporting frame 31. Another pair of pulleys 36 are rotatably supported on the inner sides of the conveyor supporting frames 31 and 32. The pulleys 36 are located near the transporting conveyor 30 and are positioned on the same horizontal level as the pulleys 34. In addition, guide rollers 37 and 38 are rotatably supported on the frames 31 and 32. These rollers 37 and 38 are positioned lower than and between the pulleys 34 and pulleys 36 as best seen in FIG. 2.

Endless belts 39 and 40 are installed on the pulleys 34 and 36 and guide rollers 37 and 38. A motor 41 is mounted to the undersurface of the conveyor supporting frame 31, and an endless belt is installed between the pulley 35 and a pulley 42 which is fastened to the output shaft of the motor 41.

Accordingly, when the feed motor 26 is driven, the feed screw 24 rotates, and the loading conveyor 30 moves or shifts together with the table 23 in a direction of arrow A which is perpendicular to the conveying direction of arrow B of the lead frames 2. On the other hand, when the motor 41 is driven, the drive shaft 33 is caused to rotate via the pulley 42, the endless belt 43 and the pulley 35, so that the endless belts 39 and 40 are rotated.

Figure 4:
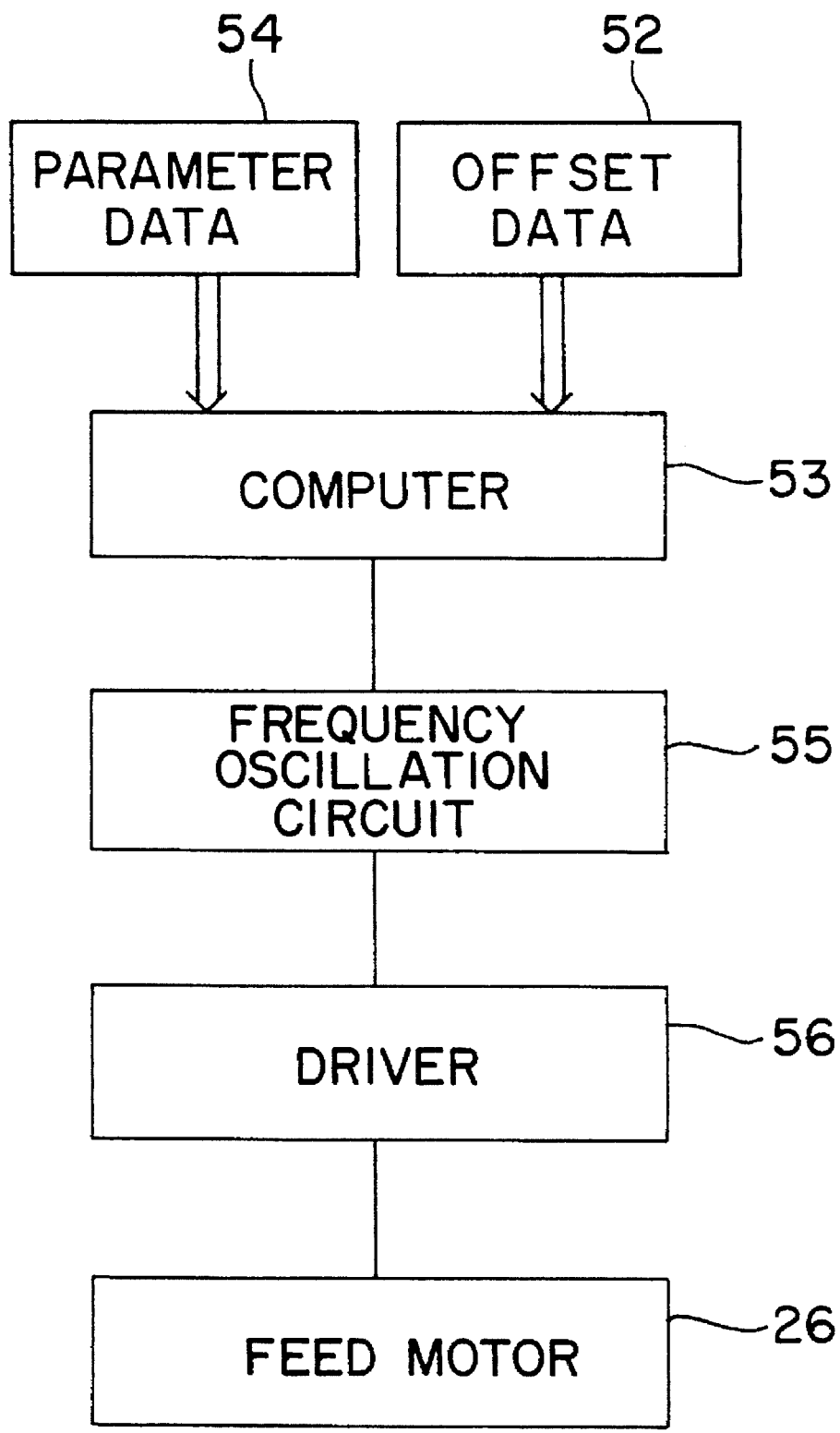
FIG. 4 is a control circuit diagram for a motor used in the storing device.

FIG. 4 illustrates the control circuit which actuates the feed motor 26. The position of the conveyor line part 50 which is near the end of the transporting conveyor 3 and the position of the inner surface 51 of the side plate 1a of the storing magazine 1 are stored beforehand in a computer 53 as offset data 52. Furthermore, the width dimension of the lead frames 2 and the thickness of the side plate 1a of the storing magazine 1 are input into the computer 53 as parameter data 54. When the parameter data 54 is inputted, the direction of rotation (forward and reverse directions) of and the amount of rotation of the feed motor 26 are calculated by the computer 53, and the feed motor 26 is driven via a frequency oscillation circuit 55 and a driver 56 in accordance with the driving timing of the feed motor 26.

In operation, if the storing magazine 1 is changed to another type or a different one of different size, the width dimension of the lead frames 2 and the thickness of the side plate 1a of the storing magazine 1 are inputted into the computer 53 as parameter data 54. As a result, the computer 53 respectively calculates the line position of the loading conveyor 30 relative to the line position of the transporting conveyor 3, and also the line position of the loading conveyor 30 relative to the storing magazine 1. Accordingly, when a lead frame 2 is fed out from the transporting conveyor 3, the feed motor 26 is actuated so that the loading conveyor 30 is positioned in a straight line with respect to the transporting conveyor 3. Then, after the lead frame 2 has been placed on the loading conveyor 30, the feed motor 26 is again driven so that the loading conveyor 30 is positioned in the correct position with respect to the storing magazine 1. Afterward, the motor 41 is driven so that the endless belts 39 and 40 of the loading conveyor 30 are rotated, thus conveying the lead frame 2 into the storing magazine 1. Then, the rear end of the lead frame 2 is pushed by a pusher (not shown), and the lead frame 2 is completely accommodated inside the storing magazine 1.

In the present invention, as seen from the above, a loading conveyor driving means which moves the loading conveyor in a horizontal direction and perpendicular to the conveying direction of the thin plate-form parts is utilized, and the driving means is computer-controlled. Accordingly, the line position of the loading conveyor is automatically adjusted to the line position of the plate-form part transporting conveyor and the position of the storing magazine by driving the loading conveyor driving means. As a result, the time required for operating preparations can be greatly reduced.

We claim:

1. A device for storing thin plate-form parts comprising: (a) an elevator which is raised and lowered and also carries and positions a storing magazine that receives thin plate-form parts; and (b) a loading conveyor which conveys thin plate-form parts, that have been conveyed from a transporting conveyor, toward said storing magazine; and wherein a loading conveyor driving means is installed so that said driving means moves said loading conveyor in a horizontal direction and perpendicular to a conveying direction of said thin plate-form parts; and further comprising:

a control means including a memory means into which parameter data indicative of a width of said plate-form parts and a thickness of a side plate of said storing magazine and offset data indicative of a position of said loading conveyor and a position of an inner surface of said side plate of said storing magazine are loaded, said control means for controlling said loading conveyor driving means in response to values of said parameter data and offset data.

2. A device for storing thin plate-form parts comprising:

an elevator that raises and lowers a storing magazine which stores thin plate-form parts in a piled-up fashion;

a loading conveyor which conveys thin plate-form parts into said storing magazine, said loading conveyor comprising a pair of rotatable endless belts positioned parallel to each other, a cylindrical feed screw positioned perpendicular to a rotational direction of said endless belts, and a driving source for said feed screw so that when said screw is rotated by said driving source said endless belts shift in a perpendicular direction relative to said rotational direction of said endless belts; and further comprising:

a control means including a memory means into which parameter data indicative of a width of said plate-form parts and a thickness of a side plate of said storing magazine and offset data indicative of a position of said loading conveyor and a position of an inner surface of said side plate of said storing magazine are loaded, said control means for controlling said driving source in response to values of said parameter data and said offset data.

* * * * *